United States Patent
Matsumura

(10) Patent No.: US 11,469,414 B2
(45) Date of Patent: Oct. 11, 2022

(54) COMPOSITE PARTICLES FOR ALL-SOLID-STATE SECONDARY BATTERY ELECTRODE AND METHOD OF PRODUCING SAME, ELECTRODE FOR ALL-SOLID-STATE SECONDARY BATTERY, AND ALL-SOLID-STATE SECONDARY BATTERY

(71) Applicant: ZEON CORPORATION, Tokyo (JP)

(72) Inventor: Taku Matsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 277 days.

(21) Appl. No.: 16/644,958

(22) PCT Filed: Aug. 24, 2018

(86) PCT No.: PCT/JP2018/031423
§ 371 (c)(1),
(2) Date: Mar. 6, 2020

(87) PCT Pub. No.: WO2019/065030
PCT Pub. Date: Apr. 4, 2019

(65) Prior Publication Data
US 2021/0036311 A1 Feb. 4, 2021

(30) Foreign Application Priority Data
Sep. 29, 2017 (JP) ............................. JP2017-191942

(51) Int. Cl.
*H01M 4/36* (2006.01)
*H01M 10/0562* (2010.01)
*H01M 10/0565* (2010.01)

(52) U.S. Cl.
CPC ....... *H01M 4/362* (2013.01); *H01M 10/0562* (2013.01); *H01M 10/0565* (2013.01); *H01M 2300/0068* (2013.01); *H01M 2300/0082* (2013.01)

(58) Field of Classification Search
None
See application file for complete search history.

(56) References Cited

U.S. PATENT DOCUMENTS

| 2005/0034299 A1* | 2/2005 | Kurihara | H01G 11/86 29/623.5 |
| 2016/0190565 A1 | 6/2016 | Woo et al. | |
| 2018/0114979 A1* | 4/2018 | Yoon | H01M 4/622 |

FOREIGN PATENT DOCUMENTS

| JP | 2006107963 A | 4/2006 |
| JP | 2012243476 A | 12/2012 |
| JP | 2013143299 A | 7/2013 |
| JP | 2016143614 A | 8/2016 |

OTHER PUBLICATIONS

May 26, 2021, the Extended European Search Report issued by the European Patent Office in the corresponding European Patent Application No. 18860091.0.
Mar. 31, 2020, International Preliminary Report on Patentability issued in the International Patent Application No. PCT/JP2018/031423.

* cited by examiner

*Primary Examiner* — Anca Eoff
(74) *Attorney, Agent, or Firm* — Kenja IP Law PC

(57) ABSTRACT

Provided are composite particles for an all-solid-state secondary battery electrode with which it is possible to form an electrode for an all-solid-state secondary battery that can cause an all-solid-state secondary battery to display excellent output characteristics, and a method of producing these composite particles. The composite particles for an all-solid-state secondary battery electrode contain an electrode active material, a binder, and an inorganic solid electrolyte that is distributed more in an outer part than in an inner part, and have a volume-average particle diameter of not less than 5 μm and not more than 90 μm. The method of producing the composite particles for an all-solid-state secondary battery electrode includes granulating a slurry composition containing an electrode active material and a binder to obtain base particles and externally adding an inorganic solid electrolyte to the base particles.

7 Claims, No Drawings

COMPOSITE PARTICLES FOR ALL-SOLID-STATE SECONDARY BATTERY ELECTRODE AND METHOD OF PRODUCING SAME, ELECTRODE FOR ALL-SOLID-STATE SECONDARY BATTERY, AND ALL-SOLID-STATE SECONDARY BATTERY

CROSS-REFERENCE TO RELATED APPLICATIONS

This application is a National Stage entry under 37 U.S.C. 371 of the International Patent Application No.PCT/JP2018/031423 filed on Aug. 24, 2018, which claims benefit of the application No. 2017-191942 filed on Sep. 29, 2017 in Japan.

TECHNICAL FIELD

The present disclosure relates to composite particles for an all-solid-state secondary battery electrode, a method of producing composite particles for an all-solid-state secondary battery electrode, an electrode for an all-solid-state secondary battery, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

All-solid-state secondary batteries in which an inorganic solid electrolyte is used instead of an organic solvent electrolyte having high flammability and high danger of ignition upon leakage are attracting attention as secondary batteries having high safety.

An electrode used in an all-solid-state secondary battery typically has a structure in which an electrode mixed material layer formed by binding an electrode active material and an inorganic solid electrolyte with a binder is stacked on a current collector. The method by which the electrode mixed material layer is formed on the current collector may, for example, be a known method in which composite particles obtained through granulation of a slurry composition containing an electrode active material, a binder, and an inorganic solid electrolyte are subjected to pressure forming on a current collector.

Specifically, in Patent Literature (PTL) 1, for example, composite particles obtained through granulation of a slurry composition containing an electrode active material, a binder, and an inorganic solid electrolyte are subjected to pressure forming on a current collector to form an electrode mixed material layer, and thereby inhibit uneven distribution of the binder in the electrode mixed material layer and obtain an electrode having high peel strength.

CITATION LIST

Patent Literature

PTL 1: JP 2012-243476 A

SUMMARY

Technical Problem

However, with regards to the conventional technique described above in which composite particles obtained through granulation of a slurry composition containing an electrode active material, a binder, and an inorganic solid electrolyte are subjected to pressure forming on a current collector to form an electrode mixed material layer, there is room for improvement in terms of further improving output characteristics of an obtained all-solid-state secondary battery.

Accordingly, one objective of the present disclosure is to provide composite particles for an all-solid-state secondary battery electrode with which it is possible to form an electrode for an all-solid-state secondary battery that can cause an all-solid-state secondary battery to display excellent output characteristics, and also to provide a method of producing these composite particles.

Another objective of the present disclosure is to provide an electrode for an all-solid-state secondary battery that can cause an all-solid-state secondary battery to display excellent output characteristics, and also to provide an all-solid-state secondary battery having excellent output characteristics.

Solution to Problem

The inventor conducted diligent investigation with the aim of solving the problem set forth above. The inventor made a new discovery that with regards to composite particles obtained through granulation of a slurry composition containing an electrode active material, a binder, and an inorganic solid electrolyte, even in a situation in which granulation of the slurry composition is carried out in a low-dew point environment (for example, an environment having a dew point of approximately −40° C. to −60° C.), degradation of the inorganic solid electrolyte due to moisture occurs, and output characteristics of an all-solid-state secondary battery cannot be sufficiently improved. As a result of further extensive investigation, the inventor discovered that output characteristics of an all-solid-state secondary battery can be sufficiently improved by using composite particles obtained by externally adding an inorganic solid electrolyte to base particles obtained through granulation of a slurry composition containing an electrode active material and a binder such that the inorganic solid electrolyte is distributed more in an outer part of the composite particles, and by setting the volume-average particle diameter of the composite particles within a specific range. In this manner, the inventor completed the present disclosure.

Specifically, the present disclosure aims to advantageously solve the problem set forth above by disclosing composite particles for an all-solid-state secondary battery electrode comprising an electrode active material, a binder, and an inorganic solid electrolyte, wherein the inorganic solid electrolyte is distributed more in an outer part than in an inner part, and the composite particles for an all-solid-state secondary battery electrode have a volume-average particle diameter of not less than 5 μm and not more than 90 μm. By using composite particles for an all-solid-state secondary battery electrode that have an inorganic solid electrolyte distributed more in an outer part of the composite particles than in an inner part of the composite particles and that have a volume-average particle diameter within a specific range in this manner, it is possible to form an electrode for an all-solid-state secondary battery that can cause an all-solid-state secondary battery to display excellent output characteristics.

The "inner part" of a composite particle referred to in the present disclosure is a region for which the distance in a radial direction of the composite particle (hereinafter, also referred to simply as the "radial direction") from the center of the composite particle is not more than half of the distance in the radial direction from the center of the composite particle to the circumferential surface of the composite particle, and the "outer part" is a part positioned further outward than the inner part in the radial direction. The distribution of an inorganic solid electrolyte in a composite particle can be determined through analysis of a cross-section of the composite particle by energy dispersive X-ray spectroscopy (EDX). Moreover, the "volume-average particle diameter" of composite particles referred to in the present disclosure can be measured in accordance with JIS Z8825:2013. Note that the "volume-average particle diameter" of composite particles referred to in the present disclosure is the particle diameter corresponding to a cumulative value of 50% in a particle size distribution (volume basis) measured using a particle size distribution analyzer based on laser scattering/diffraction (i.e., 50% volume-average particle diameter (D50)).

In the presently disclosed composite particles for an all-solid-state secondary battery electrode, a ratio of a number-average particle diameter of the inorganic solid electrolyte relative to a number-average particle diameter of the electrode active material is preferably not less than 0.08 and not more than 0.8. When the ratio of the number-average particle diameter of the inorganic solid electrolyte relative to the number-average particle diameter of the electrode active material (number-average particle diameter of inorganic solid electrolyte/number-average particle diameter of electrode active material) is within the range set forth above, it is possible to form an electrode for an all-solid-state secondary battery that has high peel strength and can further improve output characteristics of an all-solid-state secondary battery.

The "number-average particle diameter" of an electrode active material or an inorganic solid electrolyte in composite particles referred to in the present disclosure can be determined by observing 100 particles of the electrode active material or 100 particles of the inorganic solid electrolyte using an electron microscope, measuring the particle diameters thereof in accordance with JIS Z8827-1:2008, and calculating an average value of the measured particle diameters.

The presently disclosed composite particles for an all-solid-state secondary battery electrode preferably further comprise a polymeric solid electrolyte. Through inclusion of a polymeric solid electrolyte, it is possible to form an electrode for an all-solid-state secondary battery that can further improve output characteristics of an all-solid-state secondary battery.

The present disclosure also aims to advantageously solve the problem set forth above by disclosing an electrode for an all-solid-state secondary battery comprising an electrode mixed material layer containing any of the composite particles for an all-solid-state secondary battery electrode set forth above. Through inclusion of an electrode mixed material layer that is formed using the composite particles for an all-solid-state secondary battery electrode set forth above in this manner, an all-solid-state secondary battery can be caused to display excellent output characteristics.

The present disclosure also aims to advantageously solve the problem set forth above by disclosing an all-solid-state secondary battery comprising a positive electrode, a solid electrolyte layer, and a negative electrode, wherein at least one of the positive electrode and the negative electrode is the electrode for an all-solid-state secondary battery set forth above. By using the electrode for an all-solid-state secondary battery set forth above in this manner, it is possible to obtain an all-solid-state secondary battery having excellent output characteristics.

The present disclosure also aims to advantageously solve the problem set forth above by disclosing a method of producing composite particles for an all-solid-state secondary battery electrode that is a method of producing any of the composite particles for an all-solid-state secondary battery electrode set forth above, comprising: granulating a slurry composition containing an electrode active material and a binder to obtain base particles; and externally adding an inorganic solid electrolyte to the base particles. By externally adding an inorganic solid electrolyte to base particles obtained through granulation of a slurry composition containing an electrode active material and a binder in this manner, degradation of the inorganic solid electrolyte due to moisture during granulation of the slurry composition can be prevented, and composite particles for an all-solid-state secondary battery electrode capable of forming an electrode for an all-solid-state secondary battery that can cause an all-solid-state secondary battery to display excellent output characteristics can easily be obtained.

In the presently disclosed method of producing composite particles for an all-solid-state secondary battery electrode, the slurry composition is preferably granulated in an environment having a dew point of 0° C. or higher. The reason for this is that because degradation of an inorganic solid electrolyte due to moisture during slurry composition granulation can be prevented in the presently disclosed production method in which an inorganic solid electrolyte is externally added, slurry composition granulation can be carried out in an environment having a dew point of 0° C. or higher so as to lower production cost of the composite particles for an all-solid-state secondary battery electrode compared to a case in which slurry composition granulation is carried out in a low-dew point environment.

Note that the term "dew point" as used in the present disclosure refers to the dew point under atmospheric pressure determined from the amount of moisture measured by Fourier-transform infrared spectroscopy (FT-IR).

Advantageous Effect

According to the present disclosure, composite particles for an all-solid-state secondary battery electrode with which it is possible to form an electrode for an all-solid-state secondary battery that can cause an all-solid-state secondary battery to display excellent output characteristics are obtained.

Moreover, according to the present disclosure, an electrode for an all-solid-state secondary battery that can cause an all-solid-state secondary battery to display excellent output characteristics and an all-solid-state secondary battery that has excellent output characteristics are obtained.

DETAILED DESCRIPTION

The following provides a detailed description of embodiments of the present disclosure.

The presently disclosed composite particles for an all-solid-state secondary battery electrode can be used in formation of an electrode mixed material layer of an electrode for an all-solid-state secondary battery such as an all-solid-state lithium ion secondary battery. Moreover, the presently disclosed composite particles for an all-solid-state secondary battery electrode can be produced by the presently disclosed method of producing composite particles for an all-solid-state secondary battery electrode, for example. Furthermore, the presently disclosed electrode for an all-solid-state secondary battery includes an electrode mixed material layer formed using the presently disclosed composite particles for an all-solid-state secondary battery electrode and can be used as a positive electrode and/or negative electrode of the presently disclosed all-solid-state secondary battery.

(Composite Particles for all-Solid-State Secondary Battery Electrode)

The presently disclosed composite particles for an all-solid-state secondary battery electrode (hereinafter, also referred to simply as "composite particles") contain an electrode active material, a binder, and an inorganic solid electrolyte, and may optionally contain a polymeric solid electrolyte and/or other components such as a conductive material. The presently disclosed composite particles for an all-solid-state secondary battery electrode have the inorganic solid electrolyte distributed more in an outer part of the composite particles than in an inner part of the composite particles and have a volume-average particle diameter of not less than 5 μm and not more than 90 μm.

Through the presently disclosed composite particles for an all-solid-state secondary battery electrode, it is possible to form an electrode for an all-solid-state secondary battery that can cause an all-solid-state secondary battery to display excellent output characteristics. Moreover, through the presently disclosed composite particles for an all-solid-state secondary battery electrode, it is possible to form an electrode for an all-solid-state secondary battery that has excellent peel strength.

Although it is not clear why an all-solid-state secondary battery can be caused to display excellent output characteristics by using the presently disclosed composite particles for an all-solid-state secondary battery electrode, the reason for this is presumed to be as follows. The composite particles having the inorganic solid electrolyte distributed more in an outer part can be produced by, for example, externally adding the inorganic solid electrolyte to base particles obtained through granulation of a slurry composition containing the electrode active material and the binder, and thus degradation of the inorganic solid electrolyte due to moisture during slurry composition granulation can be prevented compared to a case in which composite particles are produced through granulation of a slurry composition containing an electrode active material, a binder, and an inorganic solid electrolyte. There is a concern that output characteristics of an all-solid-state secondary battery may deteriorate if the inorganic solid electrolyte becomes too unevenly distributed in an electrode mixed material layer formed using the composite particles. However, even in a situation in which the inorganic solid electrolyte is distributed more in an outer part of the composite particles, it is possible to inhibit excessively uneven distribution of the inorganic solid electrolyte in an electrode mixed material layer during electrode mixed material layer formation and to inhibit deterioration of output characteristics of an all-solid-state secondary battery by setting the volume-average particle diameter of the composite particles as not less than 5 μm and not more than 90 μm.

<Electrode Active Material>

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Note that although the following describes, as one example, a case in which the composite particles for an all-solid-state secondary battery electrode are composite particles for an all-solid-state lithium ion secondary battery electrode, the presently disclosed composite particles for an all-solid-state secondary battery electrode are not limited to the following example.

Examples of positive electrode active materials for an all-solid-state lithium ion secondary battery include, without any specific limitations, positive electrode active materials formed by inorganic compounds and positive electrode active materials formed by organic compounds. Also note that a mixture of an inorganic compound and an organic compound may be used as a positive electrode active material.

Examples of positive electrode active materials formed by inorganic compounds include transition metal oxides, complex oxides of lithium and transition metals (lithium-containing complex metal oxides), and transition metal sulfides. The transition metal may be Fe, Co, Ni, Mn, or the like. Specific examples of inorganic compounds that can be used as positive electrode active materials include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

Examples of positive electrode active materials formed by organic compounds include polyaniline, polypyrrole, polyacenes, disulfide compounds, polysulfide compounds, and N-fluoropyridinium salts.

Examples of negative electrode active materials for an all-solid-state lithium ion secondary battery include allotropes of carbon such as graphite and coke. Note that a negative electrode active material formed by an allotrope of carbon may be used in a mixed or coated form with a metal, metal salt, oxide, or the like. It is also possible to use an oxide or sulfate of silicon, tin, zinc, manganese, iron, nickel, or the like; lithium metal; a lithium alloy such as Li—Al, Li—Bi—Cd, or Li—Sn—Cd; a lithium transition metal nitride; silicone; or the like as a negative electrode active material.

The number-average particle diameter of the electrode active material is preferably 0.1 μm or more, more preferably 1 μm or more, and even more preferably 4.5 μm or more, and is preferably less than 20 μm, and more preferably less than 10 μm. When the number-average particle diameter of the electrode active material is 0.1 μm or more, handling is easy, and peel strength of an electrode for an all-solid-state secondary battery can be sufficiently increased. Moreover, when the number-average particle diameter of the electrode active material is less than 20 μm, sufficient electrode active material surface area can be ensured, and output characteristics of an all-solid-state secondary battery can be sufficiently improved.

<Binder>

Polymeric compounds such as fluoropolymers, diene polymers, and nitrile polymers can be used as the binder without any specific limitations.

Examples of fluoropolymers, diene polymers, and nitrile polymers that can be used include the fluoropolymers, diene polymers, nitrile polymers, and so forth described in JP 2012-243476 A, for example.

Moreover, one of these polymeric compounds may be used individually as the binder, or two or more of these polymeric compounds may be used in combination as the binder.

Of these polymeric compounds, it is preferable that a nitrile polymer and a polymeric compound other than a nitrile polymer are used in combination as the binder, and more preferable that a nitrile polymer and a fluoropolymer are used in combination as the binder. In a case in which a nitrile polymer and a polymeric compound other than a nitrile polymer are used in combination, the proportion constituted by the nitrile polymer among the binder (100 mass %) is preferably 1 mass % or more, and more preferably 10 mass % or more, and is preferably 50 mass % or less, and more preferably 30 mass % or less. When the proportion constituted by the nitrile polymer is not less than any of the lower limits set forth above, output characteristics of an all-solid-state secondary battery can be further improved. Moreover, when the proportion constituted by the nitrile polymer is not more than any of the upper limits set forth above, sufficient strength of an electrode for an all-solid-state secondary battery can be ensured.

The amount of the binder that is contained in the composite particles for an all-solid-state secondary battery electrode per 100 parts by mass of the electrode active material is preferably 0.1 parts by mass or more, and more preferably 0.2 parts by mass or more, and is preferably 10 parts by mass or less, and more preferably 7 parts by mass or less. When the content of the binder is not less than any of the lower limits set forth above, detachment of components contained in the composite particles, such as the electrode active material, can be sufficiently prevented. Moreover, when the content of the binder is not more than any of the upper limits set forth above, impairment of battery reactions by the binder can be avoided.

<Inorganic Solid Electrolyte>

The inorganic solid electrolyte may be a crystalline inorganic ion conductor, an amorphous inorganic ion conductor, or a mixture thereof without any specific limitations. In a case in which the all-solid-state secondary battery is an all-solid-state lithium ion secondary battery, for example, the inorganic solid electrolyte is normally a crystalline inorganic lithium ion conductor, an amorphous inorganic lithium ion conductor, or a mixture thereof.

Although the following describes, as one example, a case in which the composite particles for an all-solid-state secondary battery electrode are composite particles for an all-solid-state lithium ion secondary battery electrode, the presently disclosed composite particles for an all-solid-state secondary battery electrode are not limited to the following example.

Examples of crystalline inorganic lithium ion conductors include $Li_3N$, LISICON ($Li_{14}Zn(GeO_4)_4$), perovskite-type $Li_{0.5}La_{0.5}TiO_3$, garnet-type $Li_7La_3Zr_2O_{10}$, LIPON ($Li_{3+y}PO_{4-x}N_x$), and Thio-LISICON ($Li_{3.75}Ge_{0.25}P_{0.75}S_4$).

Examples of amorphous inorganic lithium ion conductors include glass Li—Si—S—O and Li—P—S.

Of the examples given above, the inorganic solid electrolyte for an all-solid-state lithium ion secondary battery is preferably an amorphous inorganic lithium ion conductor, and more preferably an amorphous sulfide containing Li and P from a viewpoint of electrical conductivity. Since an amorphous sulfide that contains Li and P has high lithium ion conductivity, battery internal resistance can be reduced and output characteristics can be improved by using such an amorphous sulfide as an inorganic solid electrolyte.

The amorphous sulfide containing Li and P is more preferably sulfide glass containing $Li_2S$ and $P_2S_5$, and is particularly preferably sulfide glass produced from a mixed material of $Li_2S$ and $P_2S_5$ in which the molar ratio of $Li_2S:P_2S_5$ is 65:35 to 85:15 from a viewpoint of reduction of internal resistance and improvement of output characteristics of a battery. Moreover, the amorphous sulfide containing Li and P is preferably sulfide glass ceramic obtained by reacting a mixed material of $Li_2S$ and $P_2S_5$ in which the molar ratio of $Li_2S:P_2S_5$ is 65:35 to 85:15 by a mechanochemical method. Note that the molar ratio of $Li_2S:P_2S_5$ in the mixed material is preferably 68:32 to 80:20 from a viewpoint of maintaining a state of high lithium ion conductivity.

The lithium ion conductivity of the inorganic solid electrolyte for an all-solid-state lithium ion secondary battery is not specifically limited but is preferably $1 \times 10^{-4}$ S/cm or more, and more preferably $1 \times 10^{-3}$ S/cm or more.

Note that the inorganic solid electrolyte may include one or more sulfides selected from the group consisting of $Al_2S_3$, $B_2S_3$, and $SiS_2$ as a starting material other than $Li_2S$ and $P_2S_5$ described above to the extent that ion conductivity is not reduced. Addition of such a sulfide can stabilize a glass component in the inorganic solid electrolyte.

In the same manner, the inorganic solid electrolyte may include one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. Inclusion of such an ortho-oxoacid lithium salt can stabilize a glass component in the inorganic solid electrolyte.

The number-average particle diameter of the inorganic solid electrolyte is preferably 0.1 μm or more, more preferably 0.3 μm or more, and even more preferably 0.6 μm or more, and is preferably less than 10 μm, more preferably less than 5 μm, and even more preferably 1 μm or less. When the number-average particle diameter of the inorganic solid electrolyte is 0.1 μm or more, handling is easy, and peel strength of an electrode for an all-solid-state secondary battery can be sufficiently increased. Moreover, when the number-average particle diameter of the inorganic solid electrolyte is less than 10 μm, sufficient inorganic solid electrolyte surface area can be ensured, and output characteristics of an all-solid-state secondary battery can be sufficiently improved.

A ratio of the number-average particle diameter of the inorganic solid electrolyte relative to the number-average particle diameter of the previously described electrode active material is preferably 0.08 or more, more preferably 0.1 or more, even more preferably 0.12 or more, and particularly preferably 0.14 or more, and is preferably 0.8 or less, more preferably 0.6 or less, and even more preferably 0.2 or less. When the ratio of these number-average particle diameters is not more than any of the upper limits set forth above, this facilitates an appropriate degree of penetration of the inorganic solid electrolyte into the composite particles when the inorganic solid electrolyte is externally added to base particles obtained through granulation of a slurry composition containing the electrode active material and the binder, and can further improve output characteristics of an all-solid-state secondary battery. Moreover, when the ratio of these number-average particle diameters is not less than any of the lower limits set forth above, peel strength of an electrode for an all-solid-state secondary battery can be sufficiently increased.

The amount of the inorganic solid electrolyte contained in the composite particles for an all-solid-state secondary battery electrode is an amount such that the proportion constituted by the inorganic solid electrolyte among the total amount (100 mass %) of the electrode active material and the inorganic solid electrolyte is preferably 10 mass % or more, and more preferably 20 mass % or more, and is preferably 70 mass % or less, and more preferably 60 mass % or less. When the proportion constituted by the inorganic solid electrolyte is not less than any of the lower limits set forth above, sufficient ion conductivity can be ensured, the electrode active material can be effectively used, and the capacity of an all-solid-state secondary battery can be sufficiently increased. Moreover, when the proportion constituted by the inorganic solid electrolyte is not more than any of the upper limits set forth above, a sufficient amount of the electrode active material can be ensured, and the capacity of an all-solid-state secondary battery can be sufficiently increased.

<Polymeric Solid Electrolyte>

Examples of polymeric solid electrolytes that can optionally be contained in the composite particles for an all-solid-state secondary battery electrode include materials obtained through inclusion of an electrolyte salt in a polyethylene oxide derivative, a polymer including a polyethylene oxide derivative, a polypropylene oxide derivative, a polymer including a polypropylene oxide derivative, a phosphoric acid ester polymer, a polycarbonate derivative, a polymer including a polycarbonate derivative, or the like.

In a case in which the all-solid-state secondary battery is an all-solid-state lithium ion secondary battery, for example, examples of electrolyte salts that can be used include, but are not specifically limited to, fluorine-containing lithium salts such as lithium hexafluorophosphate ($LiPF_6$), lithium tetrafluoroborate ($LiBF_4$), and lithium bis(trifluoromethanesulfonyl)imide (LiTFSI).

The composite particles for an all-solid-state secondary battery electrode preferably contain a polymeric solid electrolyte from a viewpoint of further improving output characteristics of an all-solid-state secondary battery. The amount of the polymeric solid electrolyte that is contained in the composite particles for an all-solid-state secondary battery electrode per 100 parts by mass of the electrode active material is preferably 0.1 parts by mass or more, and more preferably 1 part by mass or more, and is preferably 20 parts by mass or less, and more preferably 15 parts by mass or less. When the content of the polymeric solid electrolyte is not less than any of the lower limits set forth above, good improvement of all-solid-state secondary battery output characteristics can be achieved. Moreover, when the content of the polymeric solid electrolyte is not more than any of the upper limits set forth above, excessive aggregation of the composite particles can be inhibited.

<Other Components>

Examples of other components that can optionally be contained in the composite particles for an all-solid-state secondary battery electrode include dispersants, leveling agents, defoamers, conductive materials, and reinforcing materials. Moreover, a lithium salt may be contained as another component in a case in which the all-solid-state secondary battery is an all-solid-state lithium ion secondary battery, for example. These other components are not specifically limited so long as they do not affect battery reactions.

The other components such as lithium salts, dispersants, leveling agents, defoamers, conductive materials, and reinforcing materials may be any of those described in JP 2012-243476 A, for example, but are not specifically limited thereto. Moreover, the amounts of these other components may be the same as the amounts described in JP 2012-243476 A, for example, but are not specifically limited thereto.

<Properties of Composite Particles>

The presently disclosed composite particles for an all-solid-state secondary battery electrode are required to have the previously described inorganic solid electrolyte disposed more in an outer part of the composite particles than in an inner part of the composite particles.

The degree of uneven distribution of the inorganic solid electrolyte in the composite particles for an all-solid-state secondary battery electrode is preferably 0.01 or more, more preferably 0.1 or more, and even more preferably 0.25 or more, and is preferably less than 0.95, more preferably less than 0.8, even more preferably less than 0.6, and particularly preferably 0.35 or less from a viewpoint of further improving output characteristics of an all-solid-state secondary battery.

The "degree of uneven distribution of the inorganic solid electrolyte" referred to in the present specification indicates, in a cross-section of a composite particle for an all-solid-state secondary battery electrode, a ratio ($S1/S2$) of an average value $S1$ of the amount of the inorganic solid electrolyte contained per unit area in the inner part relative to an average value $S2$ of the amount of the inorganic solid electrolyte contained per unit area in the cross-section. A smaller value indicates that the inorganic solid electrolyte is more unevenly distributed in the outer part. The "average value of the amount of the inorganic solid electrolyte contained per unit area" in a specific region can be determined by analyzing a cross-section of a composite particle by energy dispersive X-ray spectroscopy (EDX) and then dividing the amount of the inorganic solid electrolyte that is contained in the specific region by the area of the region.

Note that greater distribution of the inorganic solid electrolyte in the outer part of the composite particles than in the inner part of the composite particles can be achieved by, for example, externally adding the inorganic solid electrolyte to base particles obtained through granulation of a slurry composition containing the electrode active material and the binder.

Moreover, the degree of uneven distribution of the inorganic solid electrolyte can be adjusted by, for example, adjusting the external addition conditions of the inorganic solid electrolyte and the number-average particle diameters of the electrode active material and inorganic solid electrolyte. Specifically, when strong shear force is applied to a mixture of the base particles and the inorganic solid electrolyte when externally adding the inorganic solid electrolyte, for example, the inorganic solid electrolyte penetrates into the base particles, and the value ($S1/S2$) for the degree of uneven distribution of the inorganic solid electrolyte increases. Moreover, when the ratio of the number-average particle diameter of the inorganic solid electrolyte relative to the number-average particle diameter of the electrode active material is reduced, for example, the inorganic solid electrolyte penetrates into the base particles, and the value ($S1/S2$) for the degree of uneven distribution of the inorganic solid electrolyte increases.

The presently disclosed composite particles for an all-solid-state secondary battery electrode are required to have a volume-average particle diameter of not less than 5 μm and not more than 90 μm. Moreover, the volume-average particle diameter of the composite particles for an all-solid-state secondary battery electrode is preferably 7 μm or more, more preferably 10 μm or more, and even more preferably 20 μm or more, and is preferably 75 μm or less, more preferably 50 μm or less, and even more preferably 40 μm or less. When the volume-average particle diameter of the composite particles is not less than any of the lower limits set forth above, peel strength of an electrode for an all-solid-state secondary battery can be sufficiently increased, and output characteristics of an all-solid-state secondary battery can be sufficiently improved. Moreover, when the volume-average particle diameter of the composite particles is not more than any of the upper limits set forth above, output characteristics of an all-solid-state secondary battery can be sufficiently improved.

(Method of Producing Composite Particles for all-Solid-State Secondary Battery Electrode)

The presently disclosed method of producing composite particles for an all-solid-state secondary battery electrode is a method of producing the composite particles for an all-solid-state secondary battery electrode set forth above and includes: a step (A) of granulating a slurry composition containing an electrode active material and a binder to obtain base particles; and a step (B) of externally adding the inorganic solid electrolyte to the base particles obtained in step (A). By externally adding the inorganic solid electrolyte to the base particles in this manner, it is easy to obtain composite particles having the inorganic solid electrolyte distributed more in an outer part of the composite particles than in an inner part of the composite particles, and degradation of the inorganic solid electrolyte due to moisture in the surrounding environment during granulation of the slurry composition can be prevented.

<Step (A)>

The slurry composition used in step (A) contains an electrode active material and a binder, and can optionally further contain a polymeric solid electrolyte and/or other components such as a conductive material. The slurry composition normally also contains a solvent such as an organic solvent. Note that although the slurry composition may contain an inorganic solid electrolyte to the extent that the objective of the present disclosure can still be achieved, the slurry composition normally does not contain an inorganic solid electrolyte.

The previously described electrode active material, binder, polymeric solid electrolyte, and other components (conductive material, etc.) can be used as the electrode active material, binder, polymeric solid electrolyte, and other components (conductive material, etc.). Preferred examples thereof and preferred proportions thereof are also as previously described.

Examples of solvents that can be used include, but are not specifically limited to, non-polar organic solvents such as cyclopentane, cyclohexane, toluene, and xylene; and polar organic solvents such as N-methyl-2-pyrrolidone (NMP).

One of these solvents may be used individually, or two or more of these solvents may be used as a mixture.

Of these solvents, a polar organic solvent is preferable as the solvent, and NMP is more preferable as the solvent from a viewpoint of enabling good dissolution of the binder and obtaining uniform base particles. Since the inorganic solid electrolyte is externally added to the base particles obtained through granulation of the slurry composition described above in the presently disclosed method of producing composite particles for an all-solid-state secondary battery electrode, degradation of the inorganic solid electrolyte can be inhibited even when a polar organic solvent such as NMP is used as the solvent of the slurry composition.

The slurry composition described above can be obtained by dispersing or dissolving the previously described components in the solvent.

The means by which the previously described components are dispersed or dissolved may, for example, involve using a mixer such as a ball mill, a sand mill, a bead mill, a pigment disperser, a grinding machine, an ultrasonic disperser, a homogenizer, a Homo Mixer, or a planetary mixer.

The solid content concentration and the viscosity of the slurry composition can be adjusted as appropriate depending on the granulation conditions.

The method by which the slurry composition is granulated to produce the base particles may, for example, be a commonly known granulation method such as spray drying granulation, tumbling bed granulation, compression-type granulation, stirring-type granulation, extrusion granulation, crushing-type granulation, fluidized bed granulation, fluidized bed multi-functional granulation, pulse combustion drying, or melt granulation, without any specific limitations.

Studies carried out by the inventor have revealed that in a situation in which composite particles are produced through granulation of a slurry composition containing an electrode active material, a binder, and an inorganic solid electrolyte, degradation of the inorganic solid electrolyte due to moisture cannot be sufficiently inhibited even when the granulation is carried out in a low-dew point environment having a dew point of −40° C. to −60° C., for example. Therefore, it is necessary to further lower the dew point of the surrounding environment in order to produce composite particles through granulation of a slurry composition containing an electrode active material, a binder, and an inorganic solid electrolyte while also inhibiting degradation of the inorganic solid electrolyte due to moisture.

However, since an inorganic solid electrolyte is externally added to base particles obtained through granulation of a slurry composition containing an electrode active material and a binder in the presently disclosed method of producing composite particles for an all-solid-state secondary battery electrode, degradation of the inorganic solid electrolyte due to moisture can be prevented even in a situation in which the surrounding environment during granulation of the slurry composition has a high dew point. Accordingly, the base particles can be obtained through granulation of the slurry composition in an environment having a dew point of preferably 0° C. or higher, and more preferably 5° C. or higher in step (A). Granulating the slurry composition in a high-dew point environment in this manner can reduce the required cost of composite particle production.

The base particles obtained in step (A) contain an electrode active material and a binder, and may optionally further contain a polymeric solid electrolyte and/or other components such as a conductive material.

Note that the volume-average particle diameter of the base particles can be set as a size that is in accordance with the volume-average particle diameter of the target composite particles.

<Step (B)>

The previously described inorganic solid electrolyte can be adopted as the inorganic solid electrolyte that is used in step (B). Preferred examples thereof and preferred proportions thereof are also as previously described.

No specific limitations are placed on the external addition of the inorganic solid electrolyte which may, for example, be carried out by mixing the base particles and the inorganic solid electrolyte in an environment having a dew point of −65° C. or lower. The mixing of the base particles and the inorganic solid electrolyte can be carried out using a known mixer such as a Henschel mixer.

The mixing time may be not less than 1 minute and not more than 60 minutes, for example. Moreover, the mixing temperature may be not lower than 0° C. and not higher than 40° C., for example.

Step (B) yields the presently disclosed composite particles for an all-solid-state secondary battery electrode set forth above, which have the inorganic solid electrolyte distributed more in an outer part than in an inner part and have a volume-average particle diameter of not less than 5 μm and not more than 90 μm.

Note that the composite particles obtained by the production method described above may be subjected to after-treatment as necessary. Specific examples of after-treatment include surface modification for enhancing fluidity or formability of the composite particles and surface coating of the composite particles with a charge control resin.

(Electrode for all-Solid-State Secondary Battery)

The presently disclosed electrode for an all-solid-state secondary battery includes an electrode mixed material layer containing the presently disclosed composite particles for an all-solid-state secondary battery electrode. More specifically, the presently disclosed electrode for an all-solid-state secondary battery includes a current collector and an electrode mixed material layer that is formed on the current collector with an optional conductive adhesive layer in-between.

By using the presently disclosed electrode for an all-solid-state secondary battery, an all-solid-state secondary battery can be caused to display excellent output characteristics.

The current collector is a material having electrical conductivity and electrochemical durability. Specifically, the current collector may, for example, be made of a metal material such as iron, copper, aluminum, nickel, stainless steel, titanium, tantalum, gold, or platinum. Of these examples, a current collector formed by aluminum is preferable as a current collector for a positive electrode, whereas a current collector formed by copper is preferable as a current collector for a negative electrode.

One of the aforementioned materials may be used individually, or two or more of the aforementioned materials may be used in combination in a freely selected ratio.

The current collector described above may be subjected to surface roughening in advance so as to increase adhesive strength with the electrode mixed material layer. The method of surface roughening may, for example, be mechanical polishing, electrolytic polishing, or chemical polishing.

The conductive adhesive layer that is optionally provided on the current collector may be a known conductive adhesive layer without any specific limitations other than being conductive and capable of increasing adhesive strength between the current collector and the electrode mixed material layer.

The electrode mixed material layer containing the composite particles for an all-solid-state secondary battery electrode can be formed through pressure forming of the composite particles for an all-solid-state secondary battery electrode, for example. Examples of pressure forming methods that can be adopted in pressure forming of the composite particles for an all-solid-state secondary battery electrode to form the electrode mixed material layer include: (1) a method in which the composite particles are supplied to a roll-type pressure forming device by a supply device such as a screw feeder and an electrode mixed material layer is formed on a current collector or a substrate; (2) a method in which the composite particles are scattered onto a current collector or a substrate, the scattered composite particles are evened by a blade or the like and the thickness thereof is adjusted, and subsequently forming is performed by a pressure application device; and (3) a method in which the composite particles are loaded into a mold and then pressure is applied to the mold.

The substrate used in method (1) and (2) can be a substrate formed by any inorganic material or organic material without any specific limitations other than being able to support the electrode mixed material layer and enabling pasting of the supported electrode mixed material layer with a current collector.

Although an electrode mixed material layer that is formed on a substrate in method (1) or (2) can be transferred onto a current collector by any method, it is preferable that the electrode mixed material layer is formed directly on a current collector from a viewpoint of obtaining an electrode for an all-solid-state secondary battery in which there is good close adherence between the current collector and the electrode mixed material layer.

Heat and/or pressure may be applied to the electrode mixed material layer that is formed on the current collector so as to unify the electrode mixed material layer with the current collector.

(All-Solid-State Secondary Battery)

The presently disclosed all-solid-state secondary battery includes a positive electrode, a solid electrolyte layer, and a negative electrode, wherein at least one of the positive electrode and the negative electrode is the presently disclosed electrode for an all-solid-state secondary battery. In other words, in the presently disclosed all-solid-state secondary battery, both the positive electrode and the negative electrode are the presently disclosed electrode for an all-solid-state secondary battery, or one of the positive electrode and the negative electrode is the presently disclosed electrode for an all-solid-state secondary battery and the other of the positive electrode and the negative electrode is an electrode for an all-solid-state secondary battery that does not correspond to the presently disclosed electrode for an all-solid-state secondary battery.

The presently disclosed all-solid-state secondary battery has excellent output characteristics as a result of the presently disclosed electrode for an all-solid-state secondary battery being used as the positive electrode and/or the negative electrode.

Note that the electrode for an all-solid-state secondary battery set forth above can be used as the presently disclosed electrode for an all-solid-state secondary battery.

Moreover, any electrode for an all-solid-state secondary battery can be used as the electrode for an all-solid-state secondary battery that does not correspond to the presently disclosed electrode for an all-solid-state secondary battery without any specific limitations other than that it does not include an electrode mixed material layer formed using the presently disclosed composite particles for an all-solid-state secondary battery electrode.

Furthermore, any solid electrolyte layer, such as a solid electrolyte layer described in JP 2012-243476 A, JP 2013-143299 A, or JP 2016-143614 A, for example, can be used as the solid electrolyte layer without any specific limitations.

The presently disclosed all-solid-state secondary battery can be obtained by stacking the positive electrode and the negative electrode such that the positive electrode mixed material layer of the positive electrode and the negative electrode mixed material layer of the negative electrode face one another with the solid electrolyte layer in-between and optionally applying pressure to obtain a laminate, subsequently placing the laminate in a battery container as obtained or after rolling, folding, or the like of the laminate in accordance with the battery shape, and sealing the battery container. Note that an expanded metal, an overcurrent preventing device such as a fuse or a PTC device, a lead plate, or the like may be placed in the battery container in order to prevent pressure increase inside the battery and the occurrence of overcharging or overdischarging. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the volume-average particle diameter of composite particles, the number-average particle diameter of an electrode active material and an inorganic solid electrolyte in composite particles, the degree of uneven distribution of an inorganic solid electrolyte in composite particles, the peel strength of an electrode for an all-solid-state secondary battery, and the output characteristics of an all-solid-state secondary battery were calculated and evaluated by the following methods.

<Volume-Average Particle Diameter of Composite Particles>

Dry measurement of the volume-average particle diameter of produced composite particles was carried out in accordance with JIS Z8825:2013 using a laser diffraction/scattering particle size distribution analyzer (MICROTRAC MT-3200II produced by MicrotracBEL Corp.) and without performing particle dispersion with compressed air.

<Number-Average Particle Diameter of Electrode Active Material and Inorganic Solid Electrolyte>

One hundred particles of an electrode active material or inorganic solid electrolyte were observed under ×10,000 magnification using an electron microscope, the particle diameters thereof were measured, and the number-average particle diameter was calculated in accordance with JIS Z8827-1:2008.

<Degree of Uneven Distribution of Inorganic Solid Electrolyte>

Cross-section processing of a produced composite particle was performed by a Cross Section Polisher® (Cross Section Polisher is a registered trademark in Japan, other countries, or both) and the obtained composite particle cross-section was analyzed by energy dispersive X-ray spectroscopy (EDX) in order to determine the position and amount of sulfur, originating from inorganic solid electrolyte, that was present in the composite particle cross-section. In the analyzed composite particle cross-section, an average value S2 (=s2/a2) for the amount of inorganic solid electrolyte contained per unit area of the cross-section was calculated from the amount s2 of all sulfur present and the area a2 of the composite particle cross-section, and an average value S1 (=s1/a1) for the amount of inorganic solid electrolyte contained per unit area in an inner part of the composite particle (region for which the distance in a radial direction of the composite particle from the center of the composite particle is not more than half of the distance in the radial direction from the center of the composite particle to the circumferential surface of the composite particle) was calculated from the amount s1 of sulfur present in the inner part and the area a1 of the inner part. The degree of uneven distribution (S1/S2) of the inorganic solid electrolyte was then calculated.

When the value of the degree of uneven distribution (S1/S2) of the inorganic solid electrolyte is less than 1, this indicates that the inorganic solid electrolyte is distributed more in the outer part of the composite particle than in the inner part of the composite particle.

<Peel Strength>

A rectangle of 1 cm (width)×10 cm (length) was cut out from a produced electrode equipped with a solid electrolyte layer as a test specimen. The test specimen was secured in place with the surface at the solid electrolyte layer side thereof facing upward. Next, cellophane tape was affixed to the surface at the solid electrolyte layer side of the test specimen. The cellophane tape was subsequently pulled in a direction at 180° from one end of the test specimen at a speed of 50 mm/min so as to peel off the cellophane tape, and the stress during peeling was measured. This measurement was performed 10 times to obtain an average value of the stress. The average value was taken to be the peel strength and was evaluated by the following standard. A larger peel strength indicates better close adherence of the solid electrolyte layer to the electrode and better electrode peel strength.

A: Peel strength of 10 N/m or more
B: Peel strength of not less than 7 N/m and less than 10 N/m
C: Peel strength of not less than 5 N/m and less than 7 N/m
D: Peel strength of not less than 3 N/m and less than 5 N/m
E: Peel strength of less than 3 N/m <Output Characteristics>

Ten all-solid-state secondary battery cells that had been produced were charged to 4.3 V by a 0.1 C constant-current method and were then discharged to 3.0 V at 0.1 C so as to determine the 0.1 C discharge capacity. Thereafter, charging was performed to 4.3 V at 0.1 C and then discharging was performed to 3.0 V at 5 C so as to determine the 5 C discharge capacity. Average values of the measured values for the 10 all-solid-state secondary battery cells were taken to be the 0.1 C discharge capacity a and the 5 C discharge capacity b. A capacity retention rate expressed by the electrical capacity ratio (b/a (%)) of the 5 C discharge capacity b and the 0.1 C discharge capacity a was calculated and was evaluated by the following standard. A higher value for the capacity retention rate indicates better output characteristics (i.e., lower internal resistance).

A: Capacity retention rate of 70% or more
B: Capacity retention rate of not less than 50% and less than 70%
C: Capacity retention rate of not less than 30% and less than 50%
D: Capacity retention rate of not less than 10% and less than 30%
E: Capacity retention rate of less than 10%

(Production Example: Production of Nitrile Polymer)

A reactor was charged with 240 parts of water, 36 parts of acrylonitrile, and 2.5 parts of sodium dodecylbenzenesulfonate (emulsifier), and the temperature was adjusted to 5° C. Next, the pressure of the gas phase was lowered and sufficient degassing was performed before adding 64 parts of 1,3-butadiene, 0.06 parts of para-menthane hydroperoxide (polymerization initiator), 0.02 parts of sodium ethylenediaminetetraacetate, 0.006 parts of ferrous sulfate (heptahydrate salt), 0.06 parts of sodium formaldehyde sulfoxylate, and 1 part of t-dodecyl mercaptan (chain transfer agent) and initiating an emulsion polymerization reaction. After termination of the reaction, the contents of the reactor were heated to 70° C. and unreacted monomer was recovered by water vapor distillation under reduced pressure to yield a water dispersion (solid content: 24 mass %) of a nitrile group-containing unsaturated polymer.

The fractional content of each monomer forming the obtained nitrile group-containing unsaturated polymer, as measured using an FT-NMR spectrometer (JNM-EX400WB) produced by JEOL Ltd., was 36 mass % of acrylonitrile monomer units (nitrile group-containing monomer units) and 64 mass % of 1,3-butadiene units.

Next, 400 mL (total solid content: 48 g) of the water dispersion of the nitrile group-containing unsaturated polymer, which had been adjusted to a solid content concentration of 12 mass %, was loaded into an autoclave that was equipped with a stirrer and had a capacity of 1 L. Nitrogen gas was passed for 10 minutes so as to remove dissolved oxygen in the water dispersion, and then 75 mg of palladium acetate was dissolved in 180 mL of water to which 4 molar equivalents of nitric acid relative to the Pd had been added and was added to the water dispersion as a hydrogenation catalyst. The system was purged twice with hydrogen gas, the contents of the autoclave were subsequently heated to 50° C. in a state of pressurization to 3 MPa with hydrogen gas, and a hydrogenation reaction (referred to as a "first stage hydrogenation reaction") was carried out. The iodine value of the nitrile group-containing unsaturated polymer at this point was 10.

Next, the autoclave was restored to atmospheric pressure, and 25 mg of palladium acetate was dissolved in 60 mL of water to which 4 molar equivalents nitric acid relative to the Pd had been added and was added into the autoclave as a hydrogenation catalyst. The system was purged twice with hydrogen gas, the contents of the autoclave were subsequently heated to 50° C. in a state of pressurization to 3 MPa with hydrogen gas, and a hydrogenation reaction (referred to as a "second stage hydrogenation reaction") was carried out for 6 hours. Thereafter, the contents of the autoclave were restored to normal temperature, the inside of the system was converted to a nitrogen atmosphere, and then concentrating was performed to a solid content concentration of approximately 40 mass % using an evaporator to yield a water dispersion of a nitrile polymer. The obtained water dispersion was dried to obtain a nitrile polymer (hydrogenated NBR) as a binder. The iodine value of the obtained nitrile polymer was 7.

Example 1

<Production of Composite Particles for all-Solid-State Secondary Battery Negative Electrode>

A slurry composition was obtained by mixing 100 parts of graphite (number-average particle diameter: 5 μm) as a negative electrode active material, 4 parts in terms of solid content of an N-methyl-2-pyrrolidone (NMP) solution of polyvinylidene fluoride (produced by Kureha Corporation; PVdF; product no.: 7200) as a binder A, 1 part in terms of solid content of an NMP solution of the nitrile polymer described above as a binder B, 7.5 parts of acetylene black (powdered DENKA BLACK produced by Denka Company Limited) as a conductive material, 5 parts in terms of solid content of an NMP solution of ZEOSPAN 8100 (ethylene oxide-propylene oxide copolymer produced by ZEON CORPORATION) and 1.5 parts in terms of solid content of an NMP solution of LiTFSI (produced by Morita Chemical Industries Co., Ltd.) as a polymeric solid electrolyte, and NMP as an organic solvent, adjusting the solid content concentration to 40%, and then performing stirred mixing using a TK Homo Mixer (produced by PRIMIX Corporation).

A spray dryer in which the system had been filled with nitrogen gas was used to perform spray drying granulation of the obtained slurry composition under conditions of a rotating disk atomizer (diameter: 65 mm) rotation speed of 25,000 rpm, a hot air temperature of 160° C., a particle collection outlet temperature of 90° C., and a dew point of 5° C. to obtain base particles.

Composite particles for a negative electrode were subsequently obtained by using a Henschel mixer (produced by Mitsui Miike Machinery Co., Ltd.) to mix 119 parts of the base particles and 150 parts of sulfide glass containing $Li_2S$ and $P_2S_5$ ($Li_2S:P_2S_5$=70:30 (molar ratio); number-average particle diameter: 0.8 μm) as an inorganic solid electrolyte for 10 minutes inside a glove box having a dew point of −80° C.

The volume-average particle diameter of the composite particles, the number-average particle diameters of the electrode active material and inorganic solid electrolyte in the composite particles, and the degree of uneven distribution of the inorganic solid electrolyte in the composite particles were measured. The results are shown in Table 1.

<Production of Negative Electrode for all-Solid-State Secondary Battery>

A quantitative feeder (NIKKA K-V SPRAYER produced by Nikka Ltd.) was used to supply the composite particles for a negative electrode to pressing rolls (roll temperature: 100° C.; pressing line pressure: 500 kN/m) of a roll press (Press Cutting Rough Surface Hot Roll produced by Hirano Gikenkogyo Co., Ltd.) at a supply rate of 300 g/min. Copper foil (current collector for negative electrode) on which a conductive adhesive layer had been formed was inserted between the pressing rolls, the composite particles supplied from the quantitative feeder were adhered onto the conductive adhesive layer, and pressure forming was performed at a rate of 1 m/min to obtain a negative electrode including a negative electrode mixed material layer having an average thickness of 100 μm and an average density of 1.5 g/cm³, formed on the current collector for a negative electrode.

<Production of Solid Electrolyte Layer-Equipped Negative Electrode>

Mixing of 5 parts in terms of solid content of an NMP solution of polyvinylidene fluoride (produced by Kureha Corporation; PVdF; product no.: 7200) as a binder and 100 parts of sulfide glass containing $Li_2S$ and $P_2S_5$ ($Li_2S:P_2S_5$=70:30 (molar ratio); number-average particle diameter: 0.8 μm) as a solid electrolyte was performed inside a glove box having a dew point of −80° C. NMP was further added as an organic solvent to adjust the solid content concentration to 30%, and then stirred mixing was performed by a TK Homo Mixer (produced by PRIMIX Corporation) to obtain a slurry composition.

The obtained slurry composition was applied onto the negative electrode mixed material layer of the negative electrode by doctor blading and was subsequently dried at 150° C. for 30 minutes to achieve stacked unification of a solid electrolyte layer of 20 μm in thickness on the negative electrode.

The peel strength of the negative electrode as an electrode for an all-solid-state secondary battery was measured and evaluated. The result is shown in Table 1.

<Production of Positive Electrode for all-Solid-State Secondary Battery>

Mixing was performed of 100 parts of lithium cobalt oxide having a layered rock salt structure (number-average particle diameter: 11.5 μm) as a positive electrode active material, 5 parts in terms of solid content of an NMP solution of polyvinylidene fluoride (produced by Kureha Corporation; PVdF; product no.: 7200) as a binder, 150 parts of sulfide glass containing $Li_2S$ and $P_2S_5$ ($Li_2S:P_2S_5$=70:30 (molar ratio); number-average particle diameter: 0.8 μm) as a solid electrolyte, and 7.5 parts of acetylene black (powdered DENKA BLACK produced by Denka Company Limited) as a conductive material. NMP was further added as an organic solvent to adjust the solid content concentration to 30%, and then stirred mixing was performed by a TK Homo Mixer (produced by PRIMIX Corporation) to obtain a slurry composition. The obtained slurry composition was applied onto aluminum foil (current collector for positive electrode) by doctor blading and was subsequently dried at 150° C. to obtain a positive electrode including a positive electrode mixed material layer having an average thickness of 100 μm and an average density of 3.5 g/cm$^3$, formed on the current collector for a positive electrode.

<Production of all-Solid-State Secondary Battery>

The solid electrolyte layer-equipped negative electrode and the positive electrode produced as described above were each punched out with a diameter of 1 cm. The solid electrolyte layer-equipped negative electrode and the positive electrode were then arranged such that the electrode mixed material layers thereof faced one another with the solid electrolyte layer in-between and such that parts thereof where an electrode mixed material layer was not formed did not overlap with one another, and were then compressed (pressing pressure: 100 MPa) by a flat plate press to obtain a laminate in which the positive electrode, the solid electrolyte layer, and the negative electrode were unified. The thickness of the laminate was 10 μm.

The laminate produced as described above was vacuum dried at a temperature of 200° C. for 24 hours, was arranged inside a coin cell, and then crimping of the coin cell was performed to produce an all-solid-state secondary battery.

Output characteristics of the all-solid-state secondary battery were measured and evaluated. The result is shown in Table 1.

Example 2

Composite particles for a negative electrode, a negative electrode, a solid electrolyte layer-equipped negative electrode, a positive electrode, and an all-solid-state secondary battery were produced in the same way as in Example 1 with the exception that in production of the composite particles for an all-solid-state secondary battery negative electrode, ZEOSPAN 8100 and LiTFSI were not used as a polymeric solid electrolyte, and the amount of the base particles mixed with sulfide glass was changed to 112.5 parts. Measurements and evaluations were performed in the same way as in Example 1. The results are shown in Table 1.

Example 3

Composite particles for a negative electrode, a negative electrode, a solid electrolyte layer-equipped negative electrode, a positive electrode, and an all-solid-state secondary battery were produced in the same way as in Example 1 with the exception that 150 parts of sulfide glass containing $Li_2S$ and $P_2S_5$ ($Li_2S:P_2S_5$=70:30 (molar ratio)) and having a number-average particle diameter of 2 μm was used as an inorganic solid electrolyte in production of the composite particles for an all-solid-state secondary battery negative electrode. Measurements and evaluations were performed in the same way as in Example 1. The results are shown in Table 1.

Example 4

Composite particles for a negative electrode, a negative electrode, a solid electrolyte layer-equipped negative electrode, a positive electrode, and an all-solid-state secondary battery were produced in the same way as in Example 1 with the exception that 100 parts of graphite having a number-average particle diameter of 3.5 μm was used as a negative electrode active material and 150 parts of sulfide glass containing $Li_2S$ and $P_2S_5$ ($Li_2S:P_2S_5$=70:30 (molar ratio)) and having a number-average particle diameter of 0.4 μm was used as an inorganic solid electrolyte in production of the composite particles for an all-solid-state secondary battery negative electrode. Measurements and evaluations were performed in the same way as in Example 1. The results are shown in Table 1.

Examples 5 and 6

Composite particles for a negative electrode, a negative electrode, a solid electrolyte layer-equipped negative electrode, a positive electrode, and an all-solid-state secondary battery were produced in the same way as in Example 1 with the exception that the rotation speed of the atomizer during spray drying granulation of the slurry composition in production of the composite particles for an all-solid-state secondary battery negative electrode was changed to 40,000 rpm (Example 5) or 12,000 rpm (Example 6). Measurements and evaluations were performed in the same way as in Example 1. The results are shown in Table 1.

Example 7

<Production of Composite Particles for all-Solid-State Secondary Battery Positive Electrode>

A slurry composition was obtained by mixing 100 parts of lithium cobalt oxide having a layered rock salt structure (number-average particle diameter: 5 μm) as a positive electrode active material, 4 parts in terms of solid content of an N-methyl-2-pyrrolidone (NMP) solution of polyvinylidene fluoride (produced by Kureha Corporation; PVdF; product no.: 7200) as a binder A, 1 part in terms of solid content of an NMP solution of the previously described nitrile polymer as a binder B, 7.5 parts of acetylene black (powdered DENKA BLACK produced by Denka Company Limited) as a conductive material, 5 parts in terms of solid content of an NMP solution of ZEOSPAN 8100 (ethylene oxide-propylene oxide copolymer produced by ZEON CORPORATION) and 1.5 parts in terms of solid content of an NMP solution of LiTFSI (produced by Morita Chemical Industries Co., Ltd.) as a polymeric solid electrolyte, and NMP as an organic solvent, adjusting the solid content concentration to 40%, and then performing stirred mixing using a TK Homo Mixer (produced by PRIMIX Corporation).

A spray dryer in which the system had been filled with nitrogen gas was used to perform spray drying granulation of the obtained slurry composition under conditions of a rotating disk atomizer (diameter: 65 mm) rotation speed of 25,000 rpm, a hot air temperature of 160° C., a particle collection outlet temperature of 90° C., and a dew point of 5° C. to obtain base particles.

Composite particles for a positive electrode were subsequently obtained by using a Henschel mixer (produced by Mitsui Miike Machinery Co., Ltd.) to mix 119 parts of the base particles and 150 parts of sulfide glass containing $Li_2S$ and $P_2S_5$ ($Li_2S:P_2S_5$=70:30 (molar ratio); number-average particle diameter: 0.8 μm) as an inorganic solid electrolyte for 10 minutes inside a glove box having a dew point of −80° C.

The volume-average particle diameter of the composite particles, the number-average particle diameters of the electrode active material and inorganic solid electrolyte in the composite particles, and the degree of uneven distribution of the inorganic solid electrolyte in the composite particles were measured. The results are shown in Table 1.

<Production of Positive Electrode for all-Solid-State Secondary Battery>

A quantitative feeder (NIKKA K-V SPRAYER produced by Nikka Ltd.) was used to supply the composite particles for a positive electrode to pressing rolls (roll temperature: 100° C.; pressing line pressure: 500 kN/m) of a roll press (Press Cutting Rough Surface Hot Roll produced by Hirano Gikenkogyo Co., Ltd.) at a supply rate of 300 g/min. Aluminum foil (current collector for positive electrode) on which a conductive adhesive layer had been formed was inserted between the pressing rolls, the composite particles supplied from the quantitative feeder were adhered onto the conductive adhesive layer, and pressure forming was performed at a rate of 1 m/min to obtain a positive electrode including a positive electrode mixed material layer having an average thickness of 100 μm and an average density of 3.5 g/cm³, formed on the current collector for a positive electrode.

<Production of Solid Electrolyte Layer-Equipped Positive Electrode>

Mixing of 5 parts in terms of solid content of an NMP solution of polyvinylidene fluoride (produced by Kureha Corporation; PVdF; product no.: 7200) as a binder and 100 parts of sulfide glass containing $Li_2S$ and $P_2S_5$ ($Li_2S:P_2S_5$=70:30 (molar ratio); number-average particle diameter: 0.8 μm) as a solid electrolyte was performed inside a glove box having a dew point of −80° C. NMP was further added as an organic solvent to adjust the solid content concentration to 30%, and then stirred mixing was performed by a TK Homo Mixer (produced by PRIMIX Corporation) to obtain a slurry composition.

The obtained slurry composition was applied onto the positive electrode mixed material layer of the positive electrode by doctor blading and was subsequently dried at 150° C. for 30 minutes to achieve stacked unification of a solid electrolyte layer of 20 μm in thickness on the positive electrode.

The peel strength of the positive electrode as an electrode for an all-solid-state secondary battery was measured and evaluated. The result is shown in Table 1.

<Production of Negative Electrode for all-Solid-State Secondary Battery>

Mixing was performed of 100 parts of graphite (number-average particle diameter: 5 μm) as a negative electrode active material, 5 parts in terms of solid content of an NMP solution of polyvinylidene fluoride (produced by Kureha Corporation; PVdF; product no.: 7200) as a binder, 150 parts of sulfide glass containing $Li_2S$ and $P_2S_5$ ($Li_2S:P_2S_5$=70:30 (molar ratio); number-average particle diameter: 0.8 μm) as a solid electrolyte, and 7.5 parts of acetylene black (powdered DENKA BLACK produced by Denka Company Limited) as a conductive material. NMP was further added as an organic solvent to adjust the solid content concentration to 30%, and then stirred mixing was performed by a TK Homo Mixer (produced by PRIMIX Corporation) to obtain a slurry composition. The obtained slurry composition was applied onto copper foil (current collector for negative electrode) by doctor blading and was subsequently dried at 150° C. to obtain a negative electrode including a negative electrode mixed material layer having an average thickness of 100 μm and an average density of 1.5 g/cm³, formed on the current collector for a negative electrode.

<Production of all-Solid-State Secondary Battery>

The solid electrolyte layer-equipped positive electrode and the negative electrode produced as described above were each punched out with a diameter of 1 cm. The solid electrolyte layer-equipped positive electrode and the negative electrode were then arranged such that the electrode mixed material layers thereof faced one another with the solid electrolyte layer in-between and such that parts thereof where an electrode mixed material layer was not formed did not overlap with one another, and were then compressed (pressing pressure: 100 MPa) by a flat plate press to obtain a laminate in which the positive electrode, the solid electrolyte layer, and the negative electrode were unified. The thickness of the laminate was 10 μm.

The laminate produced as described above was vacuum dried at a temperature of 200° C. for 24 hours, was arranged inside a coin cell, and then crimping of the coin cell was performed to produce an all-solid-state secondary battery.

Output characteristics of the all-solid-state secondary battery were measured and evaluated. The result is shown in Table 1.

Comparative Example 1

Composite particles for a negative electrode, a negative electrode, a solid electrolyte layer-equipped negative electrode, a positive electrode, and an all-solid-state secondary battery were produced in the same way as in Example 1 with the exception that in production of the composite particles for an all-solid-state secondary battery negative electrode, 100 parts of graphite having a number-average particle diameter of 1.5 μm was used as a negative electrode active material, 150 parts of sulfide glass containing $Li_2S$ and $P_2S_5$ ($Li_2S:P_2S_5$=70:30 (molar ratio)) and having a number-average particle diameter of 0.3 μm was used as an inorganic solid electrolyte, and the rotation speed of the atomizer during spray drying granulation of the slurry composition was changed to 45,000 rpm. Measurements and evaluations were performed in the same way as in Example 1. The results are shown in Table 1.

Comparative Example 2

Composite particles for a negative electrode, a negative electrode, a solid electrolyte layer-equipped negative electrode, a positive electrode, and an all-solid-state secondary battery were produced in the same way as in Example 1 with the exception that the rotation speed of the atomizer during spray drying granulation of the slurry composition in production of the composite particles for an all-solid-state secondary battery negative electrode was changed to 8,000.

Measurements and evaluations were performed in the same way as in Example 1. The results are shown in Table 1.

Comparative Example 3

A negative electrode, a solid electrolyte layer-equipped negative electrode, a positive electrode, and an all-solid-state secondary battery were produced in the same way as in Example 1 with the exception that composite particles for an all-solid-state secondary battery negative electrode were produced as described below. Measurements and evaluations were performed in the same way as in Example 1. The results are shown in Table 1. <Production of composite particles for all-solid-state secondary battery negative electrode>

In a dry room having a dew point of −45° C., a slurry composition was obtained by mixing 100 parts of graphite (number-average particle diameter: 5 μm) as a negative electrode active material, 150 parts of sulfide glass containing $Li_2S$ and $P_2S_5$ ($Li_2S:P_2S_5=70:30$ (molar ratio); number-average particle diameter: 0.8 μm) as an inorganic solid electrolyte, 4 parts in terms of solid content of a xylene dispersion of polyvinylidene fluoride (produced by Kureha Corporation; PVdF; product no.: 7200) as a binder A, 1 part in terms of solid content of a xylene dispersion of the previously described nitrile polymer as a binder B, 7.5 parts of acetylene black (powdered DENKA BLACK produced by Denka Company Limited) as a conductive material, 5 parts in terms of solid content of a xylene solution of ZEOSPAN 8100 (ethylene oxide-propylene oxide copolymer produced by ZEON CORPORATION) and 1.5 parts in terms of solid content of a xylene solution of LiTFSI (produced by Morita Chemical Industries Co., Ltd.) as a polymeric solid electrolyte, and xylene as an organic solvent, adjusting the solid content concentration to 40%, and then performing stirred mixing using a TK Homo Mixer (produced by PRIMIX Corporation).

A spray dryer in which the system had been filled with nitrogen gas was used to perform spray drying granulation of the obtained slurry composition under conditions of a rotating disk atomizer (diameter: 65 mm) rotation speed of 25,000 rpm, a hot air temperature of 160° C., a particle collection outlet temperature of 90° C., and a dew point of −45° C. to obtain composite particles for a negative electrode.

The volume-average particle diameter of the composite particles, the number-average particle diameters of the electrode active material and inorganic solid electrolyte in the composite particles, and the degree of uneven distribution of the inorganic solid electrolyte in the composite particles were measured. The results are shown in Table 1.

Comparative Example 4

Composite particles for a negative electrode, a negative electrode, a solid electrolyte layer-equipped negative electrode, a positive electrode, and an all-solid-state secondary battery were produced in the same way as in Comparative Example 3 with the exception that 100 parts of graphite having a number-average particle diameter of 10 μm was used as a negative electrode active material and 150 parts of sulfide glass containing $Li_2S$ and $P_2S_5$ ($Li_2S:P_2S_5=70:30$ (molar ratio)) and having a number-average particle diameter of 0.4 μm was used as an inorganic solid electrolyte in production of the composite particles for an all-solid-state secondary battery negative electrode. Measurements and evaluations were performed in the same way as in Example 1. The results are shown in Table 1.

Comparative Example 5

Composite particles for a negative electrode, a negative electrode, a solid electrolyte layer-equipped negative electrode, a positive electrode, and an all-solid-state secondary battery were produced in the same way as in Comparative Example 3 with the exception that 100 parts of graphite having a number-average particle diameter of 10 μm was used as a negative electrode active material and 150 parts of sulfide glass containing $Li_2S$ and $P_2S_5$ ($Li_2S:P_2S_5=70:30$ (molar ratio)) and having a number-average particle diameter of 10 μm was used as an inorganic solid electrolyte in production of the composite particles for an all-solid-state secondary battery negative electrode. Measurements and evaluations were performed in the same way as in Example 1. The results are shown in Table 1.

TABLE 1

| | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|---|
| Electrode active material | Graphite [parts by mass] | 100 | 100 | 100 | 100 | 100 | 100 | — | 100 | 100 | 100 | 100 | 100 |
| | Lithium cobalt oxide [parts by mass] | — | — | — | — | — | — | 100 | — | — | — | — | — |
| | Number-average particle diameter [μm] | 5 | 5 | 5 | 3.5 | 5 | 5 | 5 | 1.5 | 5 | 5 | 10 | 10 |
| Inorganic solid electrolyte | Sulfide glass [parts by mass] | 150 | 150 | 150 | 150 | 150 | 150 | 150 | 150 | 150 | 150 | 150 | 150 |
| | Number-average particle diameter [μm] | 0.8 | 0.8 | 2 | 0.4 | 0.8 | 0.8 | 0.8 | 0.3 | 0.8 | 0.8 | 0.4 | 10 |
| | Number-average particle diameter ratio (inorganic solid electrolyte/electrode active material) [—] | 0.16 | 0.16 | 0.4 | 0.11 | 0.16 | 0.16 | 0.16 | 0.2 | 0.16 | 0.16 | 0.04 | 1 |

TABLE 1-continued

| | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 |
|---|---|---|---|---|---|---|---|---|---|---|---|---|---|
| Binder | Polyvinylidene fluoride [parts by mass] | 4 | 4 | 4 | 4 | 4 | 4 | 4 | 4 | 4 | 4 | 4 | 4 |
| | Nitrile polymer [parts by mass] | 1 | 1 | 1 | 1 | 1 | 1 | 1 | 1 | 1 | 1 | 1 | 1 |
| | Total amount [parts by mass] | 5 | 5 | 5 | 5 | 5 | 5 | 5 | 5 | 5 | 5 | 5 | 5 |
| Polymeric solid electrolyte | ZEOSPAN 8100 + LiTFSI [parts by mass] | 6.5 | — | 6.5 | 6.5 | 6.5 | 6.5 | 6.5 | 6.5 | 6.5 | 6.5 | 6.5 | 6.5 |
| Conductive material | Acetylene black [parts by mass] | 7.5 | 7.5 | 7.5 | 7.5 | 7.5 | 7.5 | 7.5 | 7.5 | 7.5 | 7.5 | 7.5 | 7.5 |
| Composite particles | Volume-average particle diameter [μm] | 30 | 30 | 30 | 30 | 7 | 70 | 30 | 2 | 100 | 30 | 30 | 30 |
| | Degree of uneven distribution of inorganic solid electrolyte [—] | 0.3 | 0.3 | 0.05 | 0.4 | 0.4 | 0.2 | 0.3 | 0.2 | 0.2 | 1 | 1 | 1 |
| Granulation conditions | Solvent of slurry composition | NMP | NMP | NMP | NMP | NMP | NMP | NMP | NMP | NMP | Xylene | Xylene | Xylene |
| | Dew point during spray drying granulation [° C.] | 5 | 5 | 5 | 5 | 5 | 5 | 5 | 5 | 5 | −45 | −45 | −45 |
| Evaluation | Peel strength | A | A | A | B | B | A | A | E | C | D | D | C |
| | Output characteristics | A | B | B | A | B | B | A | D | D | C | D | E |

It can be seen from Table 1 that an electrode for an all-solid-state secondary battery having excellent peel strength and an all-solid-state secondary battery having excellent output characteristics were obtained in Examples 1 to 7 in which composite particles having specific properties were used. It can also be seen from Table 1 that the peel strength of an electrode for an all-solid-state secondary battery decreased and the output characteristics of an all-solid-state secondary battery deteriorated in Comparative Examples 1 and 2 in which composite particles having a volume-average particle diameter outside of a specific range were used and in Comparative Examples 3 to 5 in which an inorganic solid electrolyte was not unevenly distributed.

INDUSTRIAL APPLICABILITY

According to the present disclosure, composite particles for an all-solid-state secondary battery electrode with which it is possible to form an electrode for an all-solid-state secondary battery that can cause an all-solid-state secondary battery to display excellent output characteristics are obtained.

Moreover, according to the present disclosure, an electrode for an all-solid-state secondary battery that can cause an all-solid-state secondary battery to display excellent output characteristics and an all-solid-state secondary battery that has excellent output characteristics are obtained.

The invention claimed is:
1. Composite particles for an all-solid-state secondary battery electrode comprising an electrode active material, a binder, and an inorganic solid electrolyte, wherein
the inorganic solid electrolyte is distributed more in an outer part than in an inner part, and
the composite particles for an all-solid-state secondary battery electrode have a volume-average particle diameter of not less than 5 μm and not more than 90 μm, wherein a degree of uneven distribution of the inorganic solid electrolyte in the composite particles for an all-solid-state secondary battery electrode is 0.01 or more, where the degree of uneven distribution of the inorganic solid electrolyte indicates, in a cross-section of a composite particle, a ratio S1/S2 of an average value S1 of the amount of the inorganic solid electrolyte contained per unit area in the inner part relative to an average value S2 of the amount of the inorganic solid electrolyte contained per unit area in the cross-section, where the inner part of a composite particle is a region for which the distance in a radial direction of the composite particle from the center of the composite particle is not more than half of the distance in the radial direction from the center of the composite particle to the circumferential surface of the composite particle, and the outer part is a part positioned further outward than the inner part in the radial direction.

2. The composite particles for an all-solid-state secondary battery electrode according to claim 1, wherein a ratio of a number-average particle diameter of the inorganic solid electrolyte relative to a number-average particle diameter of the electrode active material is not less than 0.08 and not more than 0.8.

3. The composite particles for an all-solid-state secondary battery electrode according to claim 1, further comprising a polymeric solid electrolyte.

4. An electrode for an all-solid-state secondary battery comprising an electrode mixed material layer containing the composite particles for an all-solid-state secondary battery electrode according to claim 1.

5. An all-solid-state secondary battery comprising a positive electrode, a solid electrolyte layer, and a negative electrode, wherein
at least one of the positive electrode and the negative electrode is the electrode for an all-solid-state secondary battery according to claim 4.

6. A method of producing composite particles for an all-solid- state secondary battery electrode, comprising:
   granulating a slurry composition containing an electrode active material and a binder to obtain base particles; and
   externally adding an inorganic solid electrolyte to the base particles, wherein
   the composite particles comprise the electrode active material, the binder, and the inorganic solid electrolyte, wherein
   the inorganic solid electrolyte is distributed more in an outer part than in an inner part, and
   the composite particles for an all-solid-state secondary battery electrode have a volume-average particle diameter of not less than 5 µm and not more than 90 µm, where the inner part of a composite particle is a region for which the distance in a radial direction of the composite particle from the center of the composite particle is not more than half of the distance in the radial direction from the center of the composite particle to the circumferential surface of the composite particle, and the outer part is a part positioned further outward than the inner part in the radial direction.

7. The method of producing composite particles for an all-solid-state secondary battery electrode according to claim 6, wherein the slurry composition is granulated in an environment having a dew point of 0° C. or higher.

\* \* \* \* \*